(12) United States Patent
Ondrejka

(10) Patent No.: US 6,575,723 B2
(45) Date of Patent: Jun. 10, 2003

(54) MOLD BASE SYSTEM

(76) Inventor: Charles Ondrejka, 420 Wolf Lake Rd., Muskegon, MI (US) 49442

( * ) Notice: Subject to any disclaimer, the term of this patent is extended or adjusted under 35 U.S.C. 154(b) by 45 days.

(21) Appl. No.: 09/827,442

(22) Filed: Apr. 6, 2001

(65) Prior Publication Data

US 2001/0040314 A1 Nov. 15, 2001

Related U.S. Application Data

(60) Provisional application No. 60/195,729, filed on Apr. 7, 2000.

(51) Int. Cl.[7] .............................................. B29C 33/12
(52) U.S. Cl. ........................ 425/190; 425/195; 425/444; 425/552; 425/556
(58) Field of Search ................................ 425/186, 188, 425/190, 195, 182, 547, 552, 556, 444, 577

(56) References Cited

U.S. PATENT DOCUMENTS

| 4,347,051 A | * | 8/1982 | DeSantis .................... 425/78 |
| 4,743,192 A | * | 5/1988 | Higuchi .................. 425/192 R |
| 5,096,404 A | * | 3/1992 | Janos et al. .................. 425/190 |
| 5,281,121 A | * | 1/1994 | Tsutsumi et al. ........... 425/116 |
| 5,316,463 A | * | 5/1994 | Neu ............................ 425/116 |
| 5,454,705 A | * | 10/1995 | Back .......................... 425/116 |
| 5,662,946 A | * | 9/1997 | Pratt et al. ................. 425/190 |

* cited by examiner

*Primary Examiner*—Jan H. Silbaugh
*Assistant Examiner*—Emmanuel Luk

(57) ABSTRACT

A mold base system for injection molding machines comprises two cast mold bases each with interior lugs. The lugs of each mold base removeably hold an insert. The inserts are machined to define a cavity that is the negative of the part to be molded. The inserts can be changed to suit different parts without changing the mold bases, which can stay on the injection molding machine indefinitely. Ribs connect the lugs to the mold base outside walls. Two ribs and an outside wall define a pocket that provides access to an insert. The ribs are notched to enable coolant lines to be routed without interference inside the mold base. The mold base system further comprises an ejector plate and a cap. The cap is changeable to suit different configurations of the ejector pins without changing the ejector plate.

23 Claims, 8 Drawing Sheets

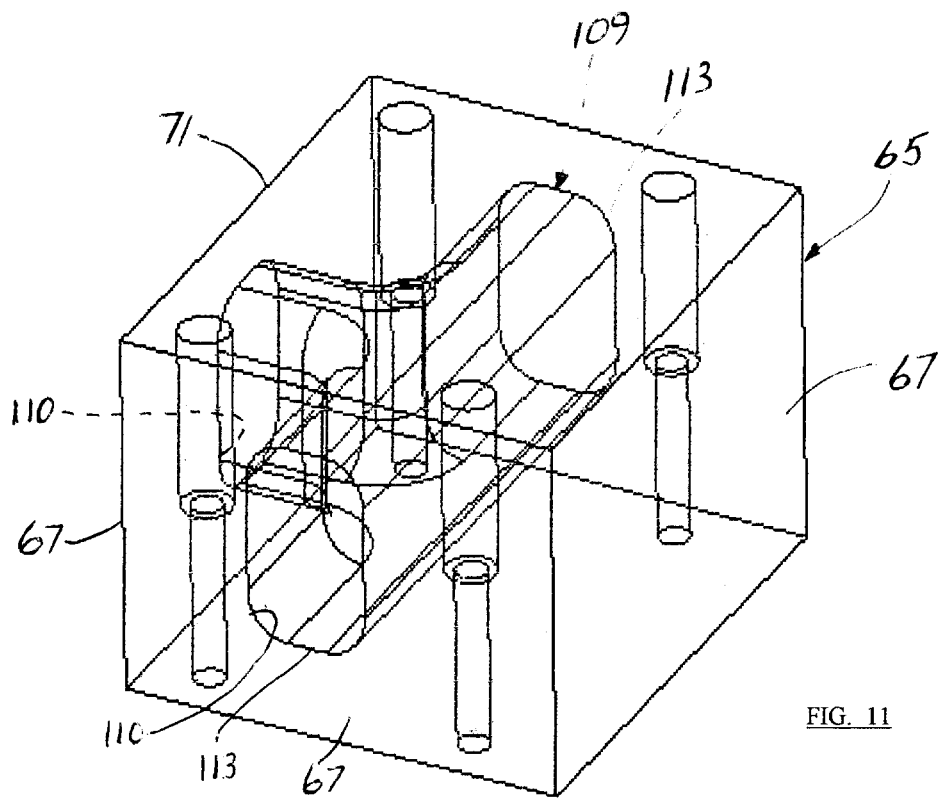
FIG. 11
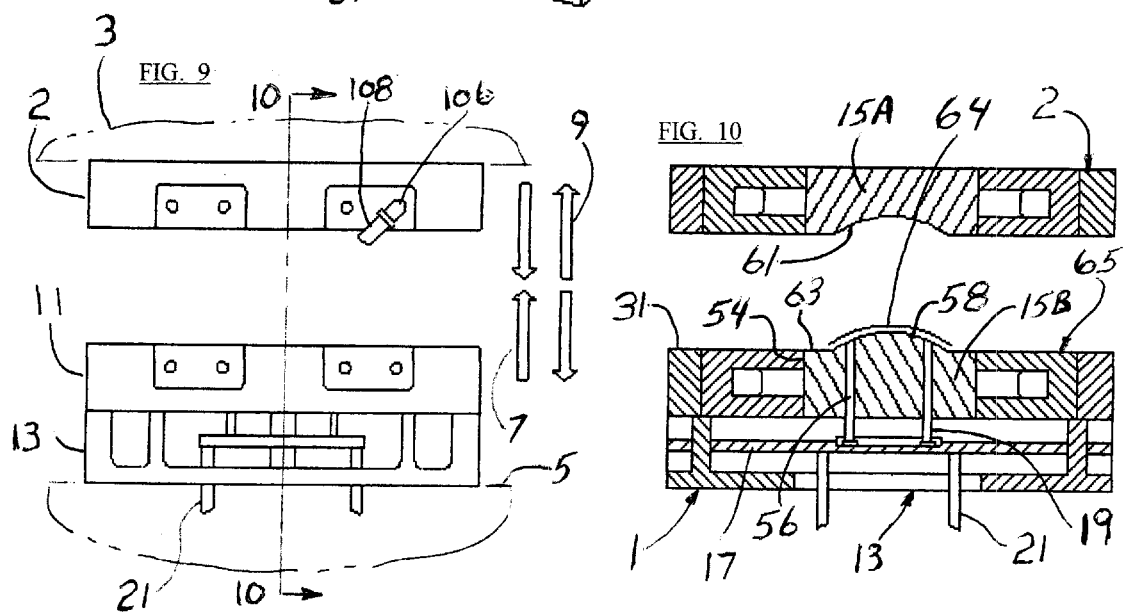
FIG. 9
FIG. 10

MOLD BASE SYSTEM

This application claims the benefit at Provisional Application No. 60/195,729, filed Apr. 7, 2000.

BACKGROUND OF THE INVENTION

1. Field of the Invention

This invention pertains to injection molding, and more particularly to apparatus associated with parts produced by an injection molding machine.

2. Description of the Prior Art

It is well known to make parts from thermosetting plastic materials on injection molding machines. Liquid plastic material is pumped at very high speed and pressure into a cavity of the proper shape and size. The cavity is defined by surfaces of two molds that reciprocate toward and away from each other. When the molds are closed against each other, the cavity is closed to accept the plastic material. After the plastic has solidified, the molds open. An ejector mechanism acts to remove the part from the molds. The cycle then repeats.

In a prior design, one mold was mounted directly to a platen of the injection molding machine. The other mold was fastened to an ejector housing. The ejector housing, in turn, was mounted to another machine platen. Although it was rather simple, the prior design had the great disadvantage of being extremely costly to make. Because of the high speeds and pressures associated with injection molding, the molds were invariably made of very strong material, such as heat treated steel. The steel material was very expensive to machine in order to make the surfaces that formed the cavity when the molds were closed. Not only did the molds represent a large investment, but also the molds could be used for only a single part. Moreover, the investment for a particular part was idle when the molds for that part were not in use.

A closely related problem concerned the prior mechanisms for ejecting parts from the molds. The ejector mechanisms included a series of ejector pins held on an ejector plate. The ejector pins were located specifically to suit the particular molds and the part to be made. The entire assembly thus represented a very substantial investment that was custom designed and constructed to suit a single part.

In an alternate prior design, the two molds were relatively small in size and were used with respective clamping or support plates. Although the cost of the material was less for the molds, the cost of machining them remained high. In addition, the ejector plate and pins had to be custom made to suit the particular part.

Another disadvantage of prior mold assemblies concerned cooling them. The molds were drilled for cooling water passages in a manner that best suited the particular part being molded. Drilling long holes in the steel molds added even more expense to the mold assembly. Further, the locations of the fitting ports on the mold exterior frequently were at inconvenient locations relative to the rest of the injection molding machine.

Thus, a need exists for improvements to injection molding machine mold assemblies.

SUMMARY OF THE INVENTION

In accordance with the present invention, a mold base system for an injection molding machine is provided that is far more economical and easier to use than prior equipment. This is accomplished by apparatus that includes a pair of mold bases each having several lugs that accurately hold an insert that forms a part producing cavity.

In keeping with the economical nature of the invention, the mold bases are cast. Each has four outside walls and opposed edge surfaces. The mold base has a floor with a central opening in it. Upstanding from the floor are the lugs. The lugs are arranged to make the corners of a geometrical configuration, such as a rectangle. A series of ribs connect the four outside walls to the lugs. The ribs are arranged to make pockets between them and the outside walls.

The lugs of each mold base are machined to accurately but removeably hold an insert. The insert associated with one mold base is contoured to form half of a cavity that is the negative of the part to be made on the injection molding machine. The insert associated with the other mold base is contoured to form the other half of the cavity.

It is an important feature of the invention that access to the insert cooling water ports is available from all sides of the insert. First fittings are inserted into the insert ports, and other fittings are connected to ports on the inside of the desired mold base wall. Tubes connect the fittings in the insert and mold base wall. To easily accommodate the tubes, the mold base ribs may be notched. In that manner, the water lines from the insert can be very easily routed to any desired wall of the mold base without being limited by the arrangement of the cooling ports in the insert. Lines connected to ports on the outside of the mold base wall lead to a pump, chiller, and other known equipment for cooling the water.

The outstanding advantage of the mold base system of the invention is that only the inserts need to be switched when molding different parts. The mold base can remain on the injection molding machine. To remove an insert, it is necessary merely to disconnect the water lines and a few screws that hold the insert to the mold base. Further, the cost of the material of the relatively small insert is much less than the cost of the entire prior mold that was replaced previously when making a new part. In addition, the cost associated with drilling the cooling holes in the prior large molds is greatly reduced.

Further in accordance with the present invention, the same cast ejector housing is usable with all the different inserts that can be used with the mold base. Consequently, the ejector housing remains permanently fastened to the mold base. The ejector housing has a number of pillars on a central wall that support both the insert and the mold base lugs and ribs. The ejector housing central wall also has several holes through it that receive knockout pins in contact with an ejector plate. The ejector plate is slidingly guided on a pair of columns upstanding from the ejector housing central wall.

In the preferred embodiment, a cap is incorporated into the ejector plate in a manner that enables the ejector plate to accommodate a wide variety of patterns for the ejector pins. The ejector plate cap is in alignment with the insert in the mold base. The cap has a counterbored hole in alignment with each of the ejector holes in the insert. A head of each ejector pin is captured between the corresponding counterbore in the ejector plate cap and a surface on the ejector plate. When switching inserts to mold a different part, it is an easy task to remove the ejector plate cap from the ejector plate and replace it with a different cap that has the new pattern of ejector pins required for the new insert.

Because of the very large forces that are produced during the molding process, it is important that the components of the mold base system be rigid. In particular, the inserts must remain stably in place during a molding cycle. To increase the rigidity of the mold base system, a series of blocks can be placed between the insert and the mold base walls and ribs. The blocks fit accurately and snugly between the insert and the mold base such that they transfer the forces of the insert to the mold base and thus rigidly retain the insert in place. To suit the cooling lines between the insert and the mold base, the blocks can be cut out in appropriate patterns.

Other advantages, benefits, and features of the present invention will become apparent to those skilled in the art upon reading the detailed description of the invention.

BRIEF DESCRIPTION OF THE DRAWINGS

FIG. 9 is an end view of the mold base assembly.

FIG. 10 is a cross-sectional view taken along line 10—10 of FIG. 9.

FIG. 11 is a perspective view of a typical block that is used with the present invention.

DETAILED DESCRIPTION OF THE INVENTION

Figure 1:
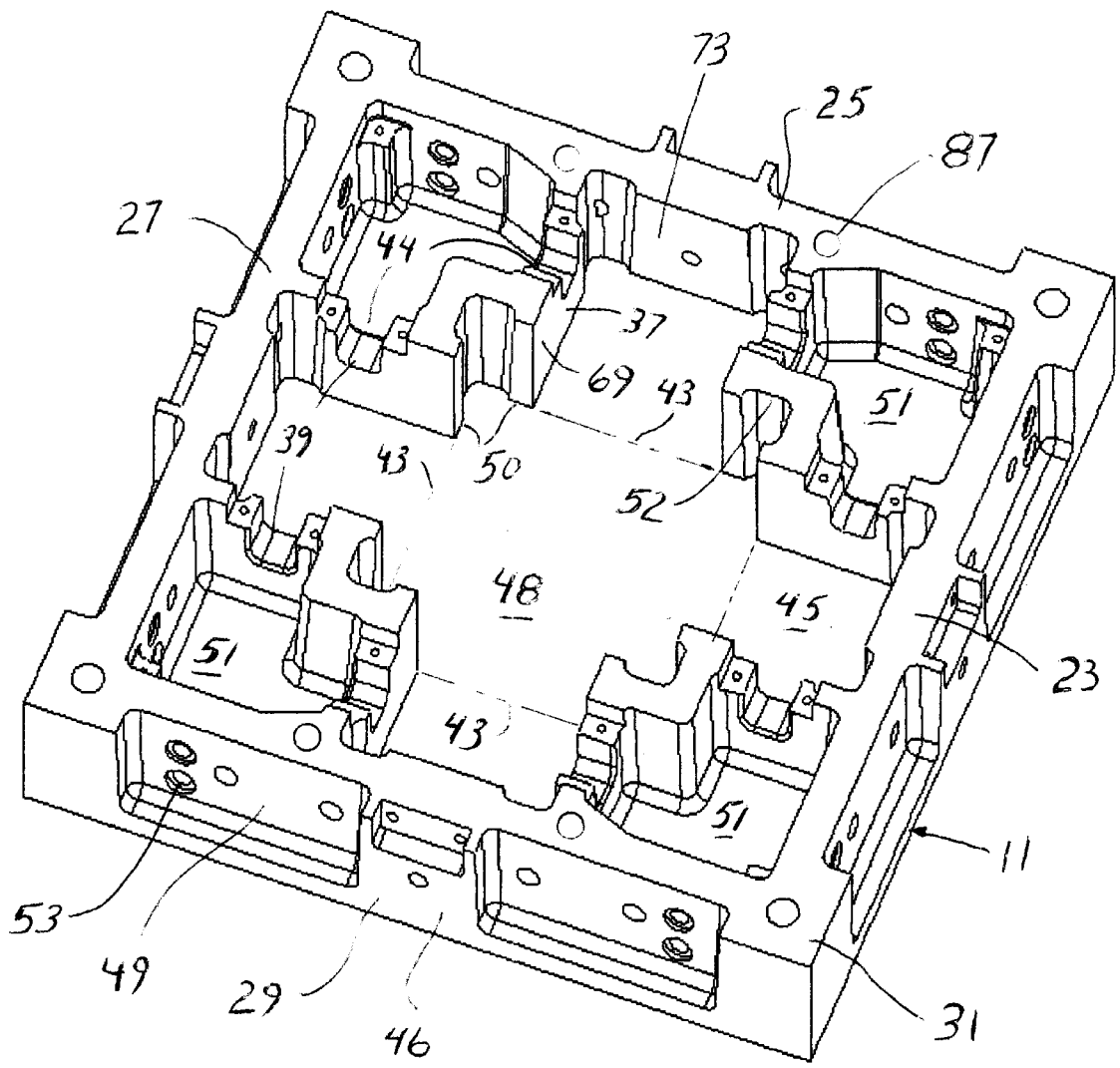
FIG. 1 is a perspective view of the top side of a typical mold base according to the present invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIGS. 9 and 10, a mold base system 1 is illustrated that includes the present invention. The mold base system 1 is particularly useful in conventional injection molding machines having platens 3 and 5. The platens 3 and 5 are capable of moving toward each other in the directions of arrows 7 to close the injection molding machine, and in the directions of arrows 9 to open the molding machine.

General

The mold base system 1 is comprised of a first mold base 2 that is mounted directly to the platen 3. The mold base system has a second mold base 11 that is substantially identical to the mold base 2. The mold base system includes an ejector housing 13 that is mounted to the machine second platen 5. The second mold base 11 is fastened to the ejector housing 13.

The mold bases 2 and 11 hold respective inserts 15A and 15B. The two inserts 15A and 15B cooperate when the injection molding machine is closed to form a cavity 64 that is the negative of the part that is to be manufactured using the injection molding machine.

An ejector plate 17 is guided by the ejector housing 13 for sliding in the directions of the arrows 7 and 9. A number of ejector pins 19 are captured in the ejector plate 17 for sliding therewith. The ejector pins 19 pass through the insert 15B to contact the part in the insert cavity 64. Reference numeral 21 represents knockout pins as are known in the art.

Mold Base

Looking also at FIGS. 1, 2, 4, and 5, the mold base 11 will be described. The mold base 2 is substantially similar to the mold base 11. The mold base is preferably manufactured as a casting having four outside walls 23, 25, 27, 29. The outside walls 23, 25, 27, 29 have a common top surface 31 and a common bottom surface 33. The bottom surfaces 33 of the outside walls extend into the bottom surface of a floor 35.

Upstanding from the mold base floor 35 are a number of lugs 37. Each lug 37 defines two flat surfaces 50 that are preferably perpendicular to each other. It is also preferred that the surfaces 50 extend up to the mold base top surface 31. There is a relief 52 at the intersection of the surfaces 50 of each lug. The lugs 37 are spaced and arranged to lie at the corners of a geometric shape, such as a rectangle defined by an imaginary perimeter 43. There is no floor inside the perimeter 43, so the floor has a central opening 48.

Each lug 37 is connected to two outside walls 23, 25, 27, 29 by two ribs 39. The ribs 39 are notched at reference numerals 44. The ribs 39 of two adjacent lugs and the associated outside wall define a pocket 45. There is no floor under the pockets 45. Thus, for the particular mold base illustrated, there is a cruciform opening between the top and bottom surfaces 31 and 33, respectively. Conversely, there are chambers 51 in the corners of the mold base. Each chamber 51 is bounded by the mold base floor 35, two ribs, and portions of two intersecting outside walls.

In the exterior surface 46 of each outside wall 23, 25, 27, 29 are recesses 49. One or more holes 53 pass through each outside wall to connect a recess 49 and the associated chamber 51. Both ends of each hole 53 are threaded.

Figure 3:
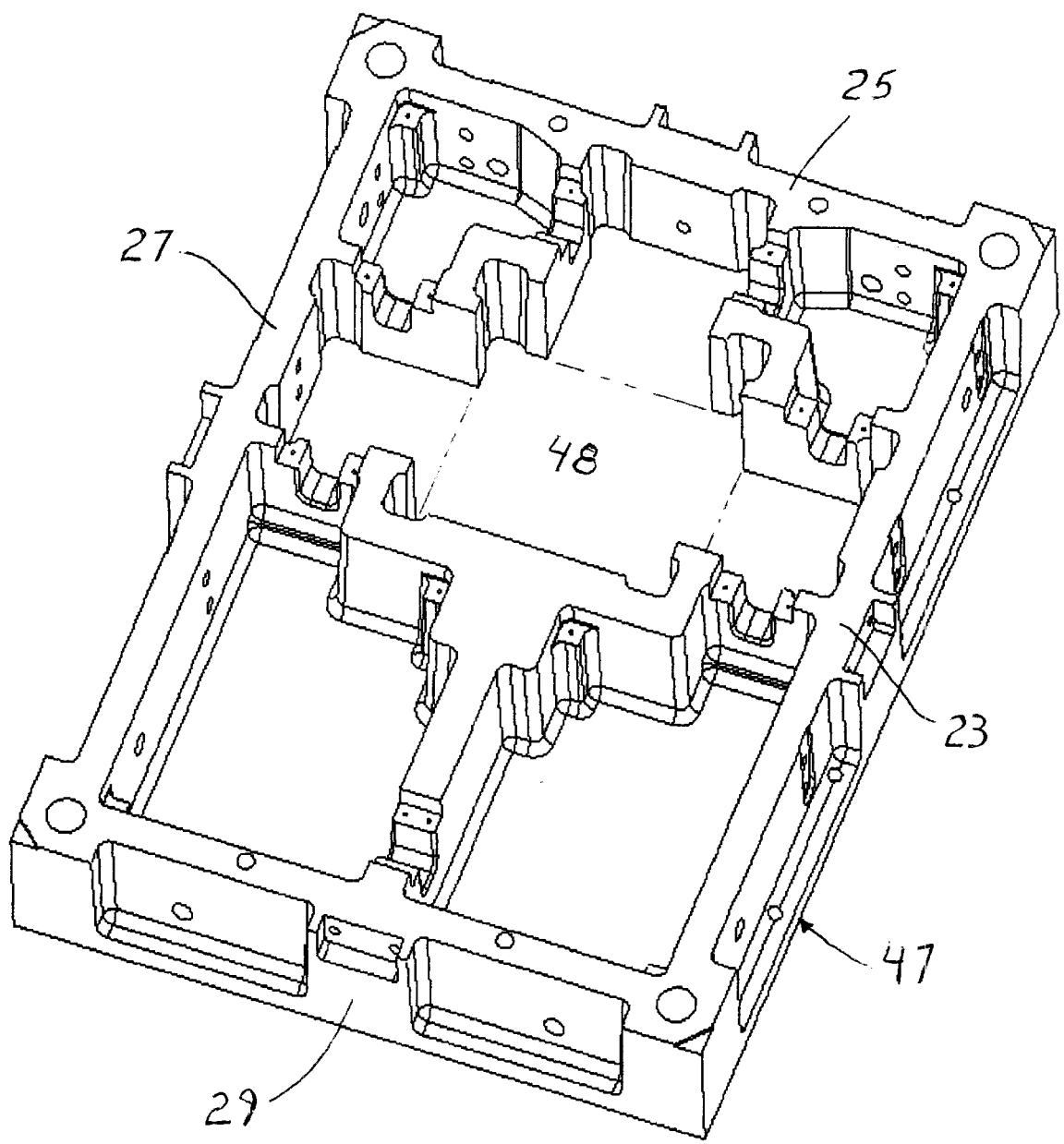
FIG. 3 is a view generally similar to FIG. 1, but showing an alternate construction for a mold base according to the invention.
Figure 4:
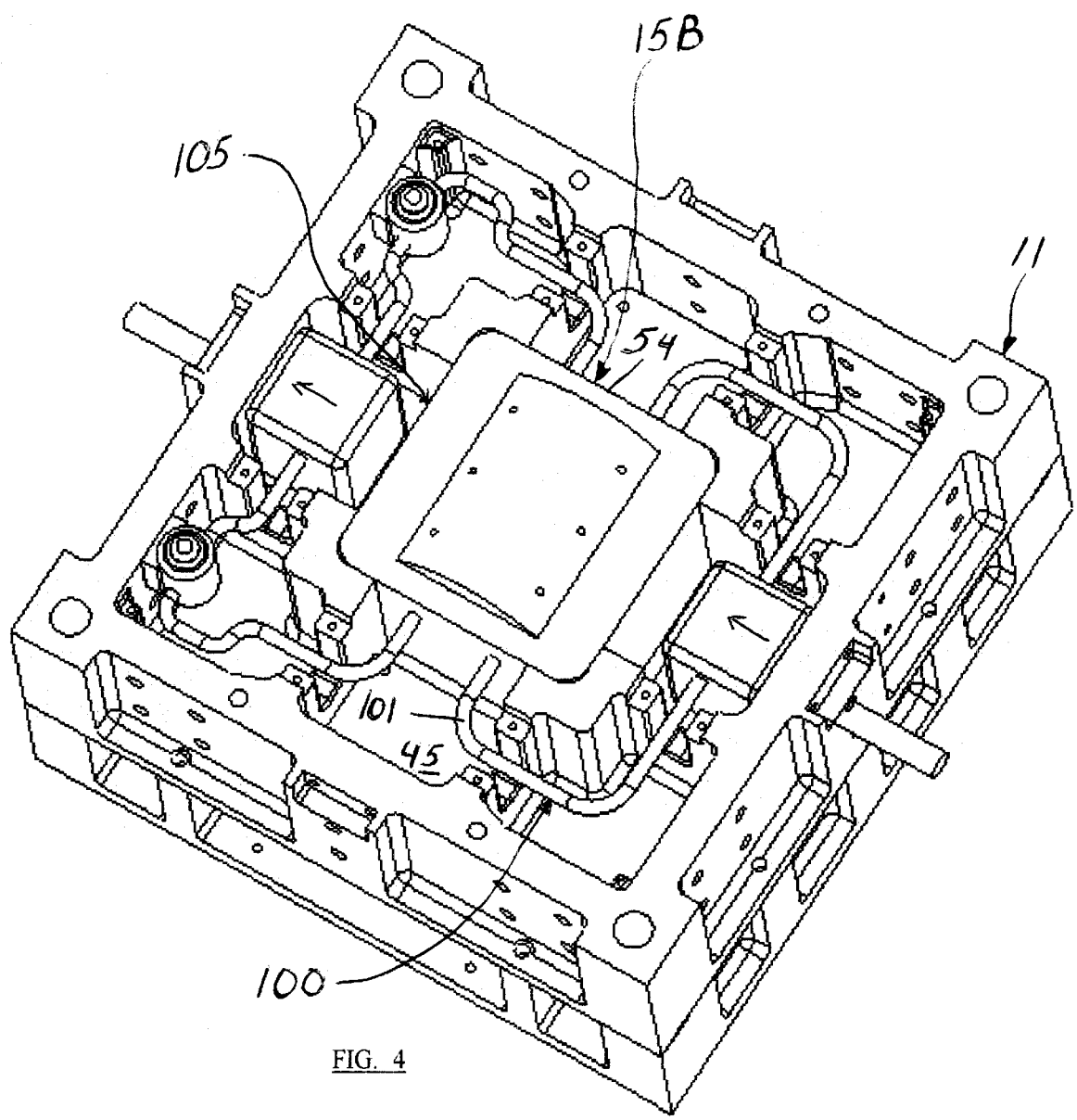
FIG. 4 is a perspective view showing a mold base fastened to an ejector housing and also partially assembled with an insert and cooling tubes.

FIG. 3 shows a modified mold base 47. The mold base 47 is generally similar to the mold base 11 described above. The only major difference is that the central opening 48' is T-shaped and is not in the center of the outside walls 23', 25', 27', 29'. The central opening 48' is defined by the lugs 37', ribs 44', and outside walls 23', 25', and 27'.

Insert

The lugs 37 of the mold base 11 removeably hold insert 15B. Specifically, the insert 15B fits snugly between the surfaces 50 of the lugs. The insert has flat outsides 54 that abut the lug surfaces 50. The reliefs 52 in the lugs ease the tasks of both machining the lug surfaces 50 and of placing the insert into fitting relation between the lugs. The insert has a land 63 that is generally in line with the mold base top surface 31. The insert is machined with a selected contoured surface 58 that suits the particular part to be made.

The lugs of the other mold base 2 hold the insert 15A. Surface 61 of the insert 15A is machined with a contour that conforms to the other insert 15B. When the ejection molding machine is closed, land 63 on the insert 15B bears tightly against a similar land on the insert 15A. The machined surfaces 58 and 61 cooperate to form a cavity 64 that is the negative of the part to be molded using the injection molding machine.

The insert 15B has a number of holes 56 through it. The holes 56 are sized and located to suit the particular part being made.

Figure 5:
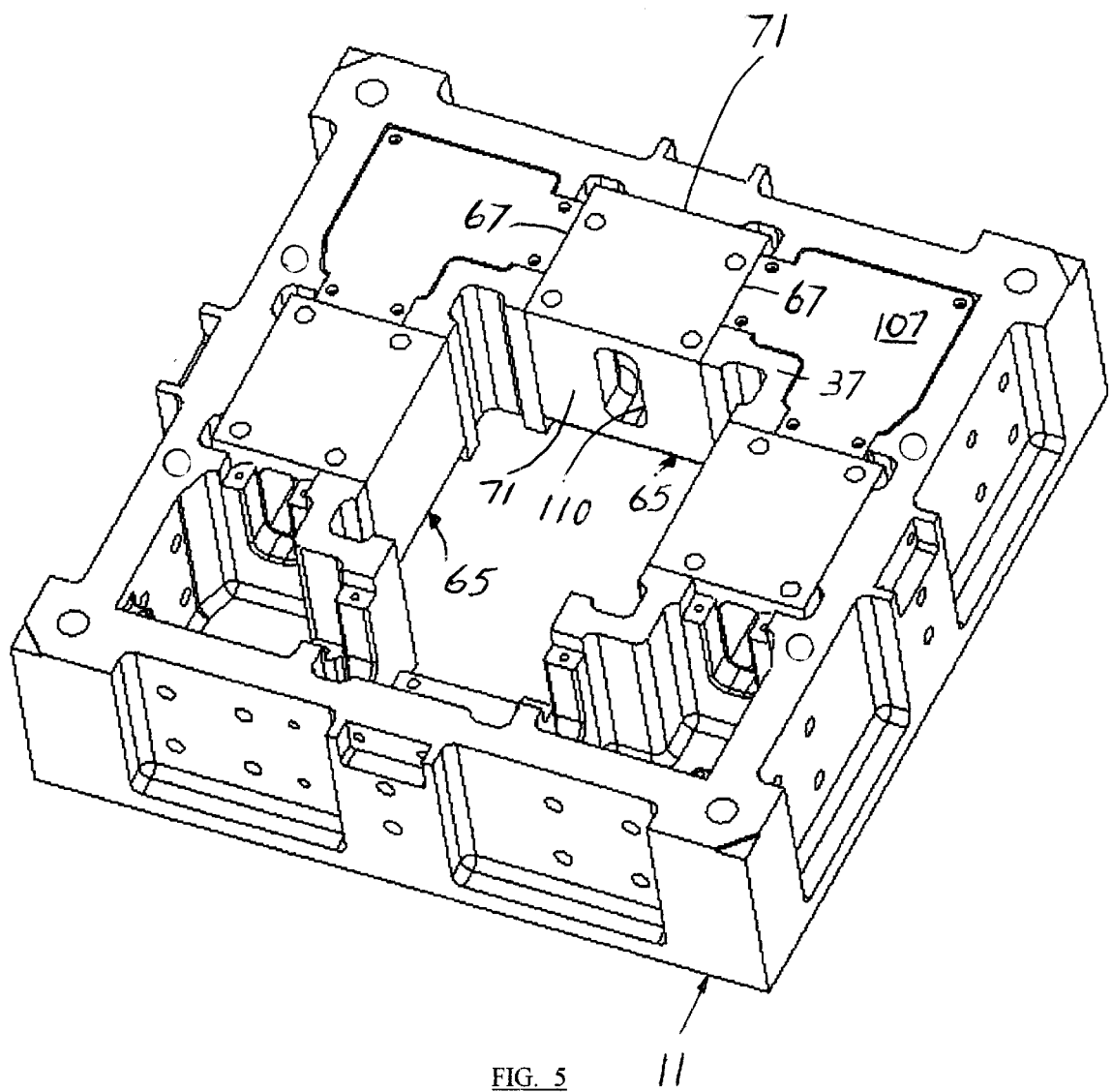
FIG. 5 is a view generally similar to FIG. 1, but showing the mold base partially assembled with blocks and covers.

Because of the large forces on the inserts 15A and 15B during the molding process, it is desirable that they be retained in the mold bases 2 and 11 by structure additional to the lugs 37. FIG. 5 shows blocks 65 placed in the mold base 11. Each block 65 has first opposed sides 67 and second opposed sides 71. The first sides 67 fit snugly between machined side surfaces 69 of two mold base ribs 39, FIG. 1. One side 71 abuts a machined surface 73 of each mold base wall, such as wall 25. The second side 71 abuts an insert outside surface 54. The blocks aid the lugs and ribs in retaining the insert rigidly in place during molding operations.

Figure 2:
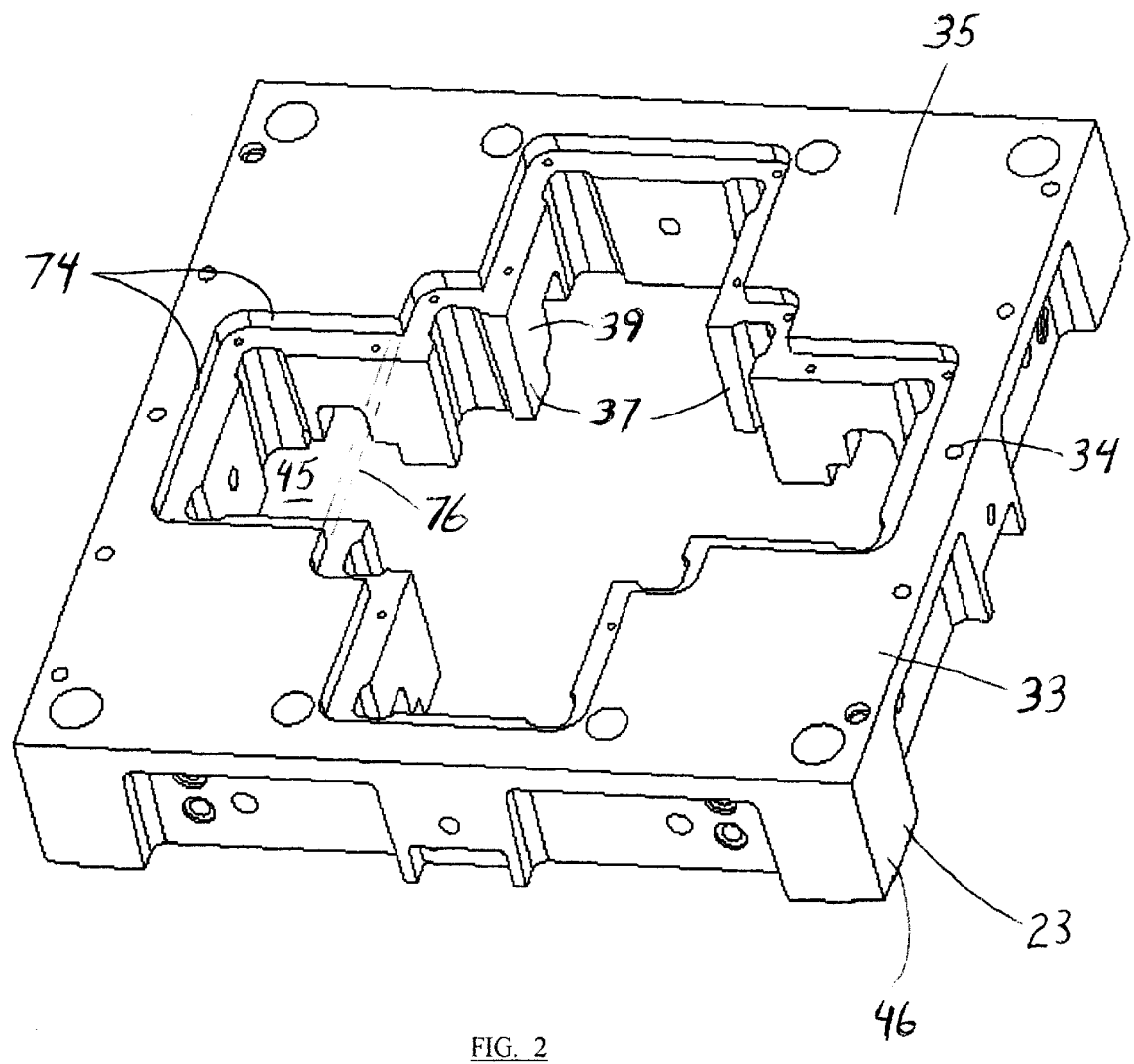
FIG. 2 is a perspective view of the bottom of the mold base of FIG. 1.

As best shown in FIG. 2, the mold base floor 35 may be machined with a step 74 around the pockets 45. Optional cover plates shown at phantom lines 76 can be placed in and fastened to the steps 74. The cover plates 76 help hold the blocks 65 in place. In the embodiment shown in FIG. 5, no steps 74 or cover plates 76 are used.

Ejector Housing

Figure 6:
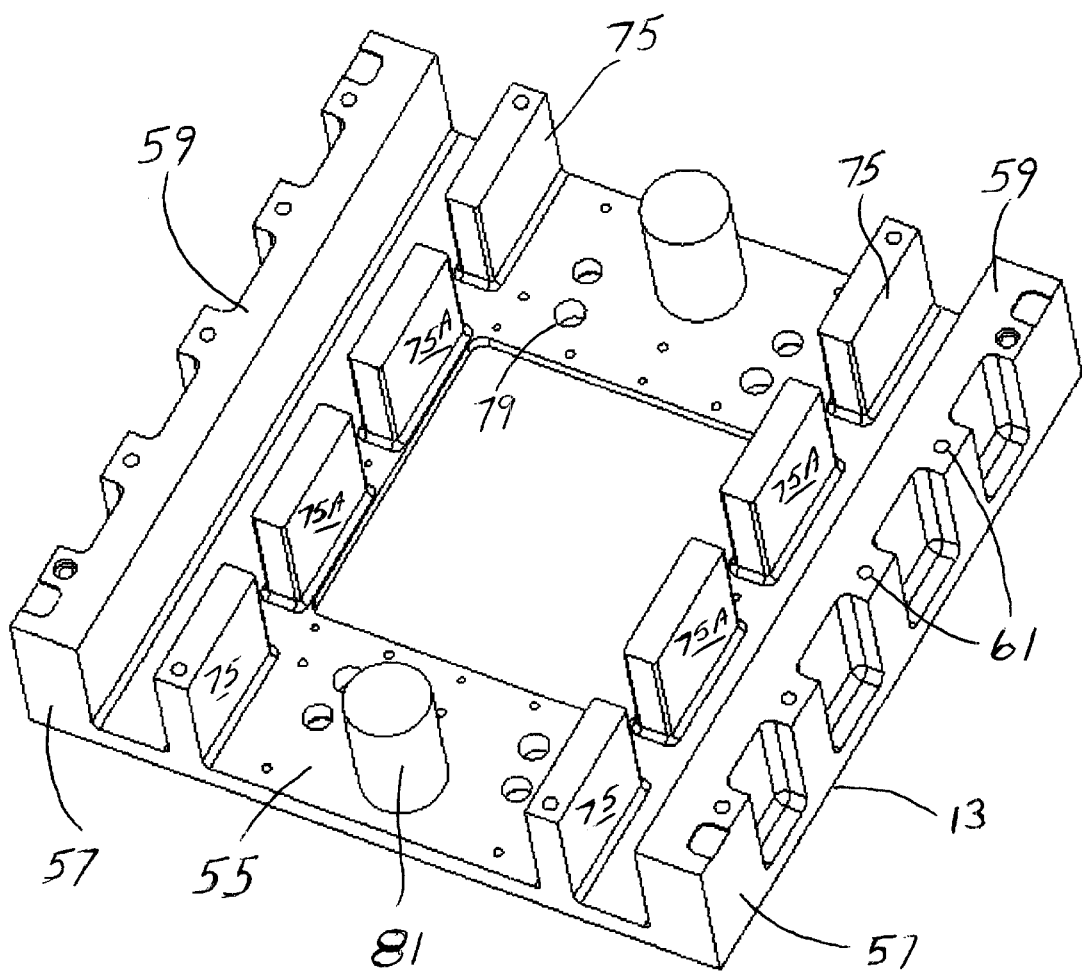
FIG. 6 is a perspective view showing the ejector housing of the invention.

Next looking at FIG. 6, the ejector housing 13 will be described. The ejector housing has a central wall 55 and two side walls 57. Each side wall 57 has a flat upper surface 59. The ejector housing upper surfaces 59 mate with the bottom surface 33 of the mold base 11 (FIG. 2). Holes 60 in the ejector housing align with the holes 34 in the mold base. Fasteners, not shown, engage the holes 60 and 34 to fasten the ejector housing to the mold base.

Also upstanding from the ejector housing central wall 55 are rows of pedestals 75 and 75A. As illustrated, the four outermost pedestals 75 abut the floor 35 of the mold base 11 when the mold base and ejector housing are fastened together. The inner four pedestals 75A abut against the blocks 65 as well as portions of the mold base floor. The ejector housing imparts maximum rigidity to the mold base and blocks.

Reference numerals 79 indicate a pattern of holes through the ejector housing central wall 55. The holes 79 slidingly receive some of the knockout pins 21. There is a pair of heavy columns 81 on the ejector housing central wall near the ends of the ejector housing and between the side walls 57.

Ejector Plate

Figure 7:
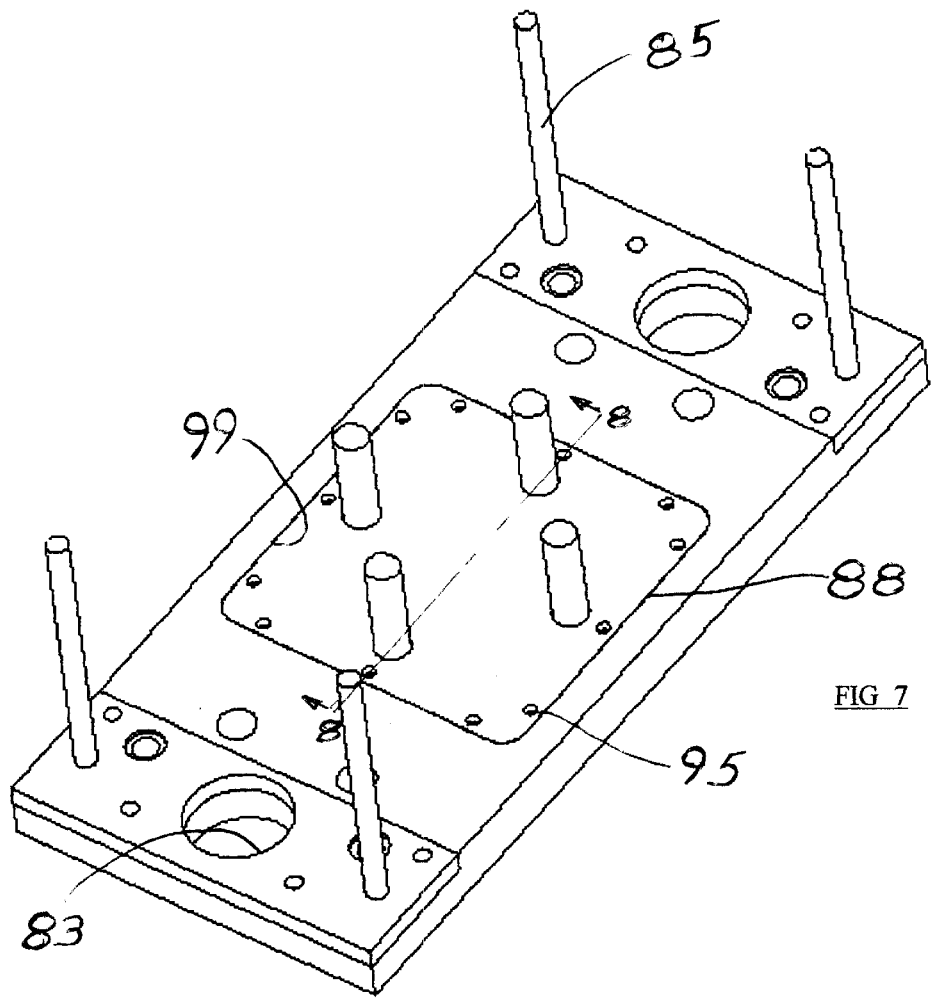
FIG. 7 is a perspective view showing the ejector plate of the invention.
Figure 8:
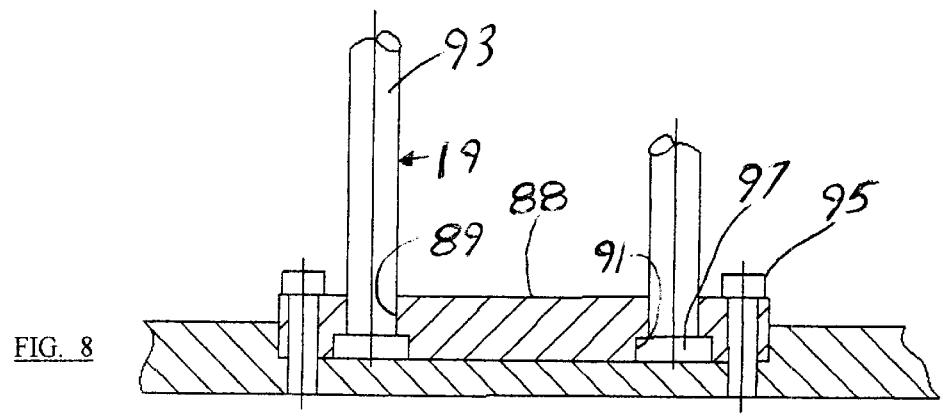
FIG. 8 is a cross-sectional view taken along line 8—8 of FIG. 7, but showing the ejector pins assembled.

The columns 81 of the ejector housing 13 are used to slidingly guide the ejector plate 17. Looking also at FIGS. 7 and 8, the ejector plate has two large holes 83 that receive the ejector housing columns. Optional return pins 85 in the ejector plate pass through holes 87 in the mold base walls 25 and 29 (FIG. 1). The return pins 85 strike the mold base 2 during closing of the injection molding machine to assure proper retraction of the ejector pins 19 prior to injecting the liquid plastic material into the cavity 64.

The ejector plate 17 includes the ejector pins 19 and a cap 88. The cap 88 has a hole 89 with a counterbore 91 for each ejector pin. The cap is joined to the ejector plate by fasteners 95 with the ejector pin heads 97 captured between the cap and the ejector plate. In the illustrated construction, the ejector plate is recessed at reference numeral 99 to receive the cap. The counterbored holes 89, and thus the ejector pins, are arranged to align with ejector holes 56 in the particular insert 15B. The shanks 93 of the ejector pins pass through corresponding holes in the insert 15B and terminate at the contoured surface 58 in a manner substantially similar to the ejector pins of prior mold bases.

Cooling System

An outstanding feature of the present invention is that the cooling system for the inserts 15A and 15B in the mold bases 2 and 11 is readily adaptable to both the inserts and the mold bases. Looking especially at FIG. 4, a typical cooling system 100 has tubes 101 that are shown connected to the sides 54 of the inserts 15B in the mold base 11. It will be appreciated by those skilled in the art that the pattern of the cooling holes in different inserts varies widely. Accordingly, it is likely that some inserts used with the mold base system 1 could have cooling tubes connected to the insert side 105 in addition to or in place of the side 54. Because of the mold base pockets 45 adjacent each of the insert sides, the cooling tubes 101 can be located around all sides of the inserts without interference from the mold bases.

The cooling tubes 101 normally have a first fitting that is screwed into the insert side 54. The second end of each cooling tube is connected to a second fitting that is screwed into the inside of a selected one of the holes 53 in the mold base walls 23, 25, 27, 29. The cooling tubes can pass through the notches 44 in any of the ribs 39 to reach the desired hole 53. Another fitting 106 is screwed into the outside of the hole 53. The outside fitting 106 connects to a line 108 that goes to a source of cooling water. The mold base pockets, notched ribs, and holes 53 make the mold base very versatile as to the location of each external line 108 between the mold base and the source of cooling water. Hence, the external cooling lines can be easily arranged to suit the particular requirements of the injection molding machine, and independent of the particular cooling hole pattern of the insert. The same construction and function of the cooling system 100 apply to both mold bases 2 and 11.

To protect the cooling system 100 inside the mold base chambers 51, covers 107 are used. The covers 107 fit between the ribs 39 and the mold base walls and around the lugs 37. The covers also protect any electronic components that may be present in the chambers.

It will be recognized that some of the blocks 65 described previously could interfere with the cooling system tubes 101 and the connectors at the inserts 15A and 15B and at the mold base outside walls 23, 25, 27, or 29. To prevent such interference, the blocks are hollowed out for passages of the tubes and fittings. A block with typical passages 109 is shown in FIG. 11. It is anticipated that a generally T-shaped passage 109 will suit the majority of cooling systems. One leg of the T-shaped passage opens at reference numeral 110 into one of the sides 71 of the block. That side is placed against the insert. Cross legs of the passage open at reference numerals 113 in the block sides 67. The openings 113 align with the notches 44 in the mold base ribs 39 to enable the cooling tubes to run from the insert to the mold base outside walls.

Operation

In use, the mold base system 1 is assembled with the inserts 15A and 15B, blocks 65, and cooling system 100. The mold base system uses the same mold bases 2 and 11, ejector housing 13, and ejector plate 17 for any inserts 15A and 15B that fit in the mold bases. Only the inserts and ejector plate cap 88 with the ejector pins 19 need to be switched when a different part is to be made on the ejection molding machine. The cost savings of having to machine the contoured surfaces 58 and 61 only on the inserts instead of on entire mold bases, as was necessary previously, are substantial. As an example, for a particular part, the raw stock of a steel billet used in a prior conventional molding process weighed 947 pounds. Six-hundred twenty pounds of material were removed to make the desired contoured surface for the part such that the final mold base weighed 327 pounds. By using the present invention, the raw stock of the cast mold base was 477 pounds. Only 160 pounds of material had to be machined from the casting, which resulted in a final weight of 321 pounds for the mold base. Thus, over 500 pounds less of material was needed using the present invention.

As a related benefit, it is much easier to switch just the inserts 15A and 15B than the entire mold base system 1 as is required in conventional equipment when making a new part. With the prior equipment, the entire mold bases had to be removed from the ejection molding machine platens 3 and 5. That procedure invariably required the use of a crane and thus was both laborious and costly. With the mold base system of the invention, on the other hand, only the inserts 15A and 15B need be replaced, together with the cap 88. The inserts may be small enough to switch by hand, thereby greatly reducing unproductive down time.

Another outstanding benefit of the invention is that the amount of unproductive inventory inherent in prior mold bases is greatly decreased. Instead of having to store a pair of mold bases for each part to be made, only the inserts 15A and 15B and the ejector plate caps 88 need to be stored. The reduction in inventory costs is substantial.

The desired inserts 15A and 15B are held in the mold bases 2 and 11 in the manner that best suits the particular part to be molded, the insert, and the mold base. No consideration is required for the cooling system 100, because the inserts are accessible on all sides. Similarly, the mold bases are accessible on all four sides. Consequently, cooling tubes 101 between the inserts and the mold base outside walls 23, 25, 27, 29, and between the mold base and the cooling equipment, can be routed in the most desirable way without regard for spatial limitations normally encountered on prior mold bases. The cooling tubes are installed in the most convenient way between the inserts and the mold base outside walls. The lines from the mold base are assembled and routed independently of the inserts. The versatility of the cooling system is a great advantage of the invention.

In summary, the results and advantages of injection molded parts can now be more fully realized. The mold base system 1 provides both the ability to switch the inserts 15A and 15B for different parts as well as to customize the cooling system 100 to suit different inserts. This desirable result comes from using the combined functions of the mold base outside walls 23, 25, 27, 29 and the lugs 37. The pockets 45 provide access to all sides of the inserts for routing the cooling tubes 101. The rib notches 44 enable cooling tubes to connect between any side of the insert and any mold base outside wall. Accordingly, the cooling system lines outside the mold base can be assembled in the most advantageous way without regard for the insert or mold base orientation. The blocks 65 aid in rigidly retaining the inserts in place. The ejector plate 17 and cap 88 capture the ejector pins 19 between them. Upon switching inserts, only the cap has to be switched to suit the new insert; the ejector plate remains with the mold base for using with the new insert.

It will also be recognized that in addition to the superior performance of the mold system 1, its construction is such as to be substantially less costly than traditional mold bases, ejector housings, and ejector plates. Also, because the mold base system is constructed of a simple design and with rugged components, it will give long service life with minimum maintenance.

Thus, it is apparent that there has been provided, in accordance with the invention, a mold base system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A mold base system comprising:
 a. first and second mold bases each comprising:
  i. a plurality of outside walls having respective top and bottom surfaces;
  ii. a floor;
  iii. a plurality of lugs upstanding from the floor and arranged to form the corners of a selected geometric shape that defines a perimeter; and
  iv. at least one rib between each lug and an associated outside wall;
 b. an ejector housing comprising:
  i. a central wall, and a pair of side walls fastened to the bottom surface of the first mold base; and
  ii. a pair of columns upstanding from the central wall;
 c. an ejector plate guided on the ejector housing columns for sliding toward and away from the first mold base;
 d. a cap joined to the ejector plate; and
 e. a plurality of ejector pins each having a head captured between the ejector plate and the cap, and a shank that is located inside the geometric shape periphery defined by the mold base lugs, the ejector pin shanks being capable of entering an insert that is removeably holdable in the first mold base lugs.

2. The mold base system of claim 1 wherein each mold base further comprises a first rib between each lug and a first selected outside wall, and a second rib between each lug and a second selected outside wall.

3. The mold base system of claim 2 wherein each rib is notched.

4. The mold base system of claim 1 wherein:
 a. each mold base has first, second, third, and fourth outside walls arranged in a rectangle;
 b. each mold base has first, second, third, and fourth lugs; and
 c. a first rib is connected between the first lug and the first outside wall, a second rib is connected between the first lug and the second outside wall, a third rib is connected between the second lug and the second outside wall, a fourth rib is connected between the second lug and the third outside wall, a fifth rib is connected between the third lug and the third outside wall, a sixth rib is connected between the third lug and the fourth outside wall, a seventh rib is connected between the fourth lug and the fourth outside wall, and an eighth rib is connected between the fourth lug and the first outside wall.

5. The mold base system of claim 1 wherein:
 a. each mold base comprises a first rib connecting a first lug to a first outside wall;
 b. each mold base comprises a second rib connecting a second lug to the first outside wall; and
 c. the first and second ribs and the first outside wall cooperate to define a pocket that intersects the perimeter of the selected geometric shape,
 so that an insert held in the lugs is accessible from the pocket.

6. The mold base system of claim 1 wherein:
 a. each mold base comprises:
  i. four outside walls;
  ii. first, second, third, and fourth lugs upstanding from the floor;
  iii. first, second, third, and fourth pairs of ribs, each pair of ribs connecting a respective lug to two different outside walls, the ribs being arranged to cooperate with the outside walls to define four pockets each defined by a respective outside wall and by two ribs that connect the respective outside wall to two different lugs, each pocket intersecting the periphery of the mold base geometric shape,
  so that an insert holdable in the lugs is accessible from the four pockets.

7. The mold base system of claim 6 further comprising a block placed in at least one pocket that aids in retaining an insert held in the lugs.

8. The mold base system of claim 6 wherein each lug cooperates with the respective pair of ribs and the associated mold base outside walls to partially bound a chamber, the chamber being further bounded by the floor.

9. The mold base system of claim 8 wherein:
  a. the outside walls of each mold base have holes therethrough that communicate with each chamber;
  b. the mold base system further comprises at least one cooling tube having a first end connected to an insert held in the lugs and a second end connected to a selected hole in a selected mold base outside wall.

10. The mold base system of claim 9 wherein each rib is notched, and wherein said at least one cooling tube passes through the notch of at least one rib.

11. The mold base system of claim 7 wherein the block has a passage therethrough to enable a cooling tube to pass through the block from an insert held in the lugs.

12. The mold base system of claim 1 wherein the ejector housing comprises a plurality of pedestals upstanding from the central wall and abutting the floor of the first mold base.

13. A mold base for use with an injection molding machine to mold a selected part comprising:
  a. a plurality of walls arranged in a generally rectangular shape having four corners;
  b. a plurality of lugs inside the walls and arranged to form the corners of a selected geometric shape and size, the lugs being capable of removably holding an insert with a surface that conforms to a portion of the selected part;
  c. a plurality of ribs each connecting a respective lug with a selected wall; and
  d. a floor between each corner and an associated lug.

14. The mold base of claim 13 wherein two ribs connect each lug with two different walls.

15. The mold base of claim 13 wherein:
  a. a first rib connects a first lug to a first wall;
  b. a second rib connects a second lug to the first wall; and
  c. the first and second ribs and the first wall cooperate to define a pocket that intersects the geometric shape periphery,
    so that an insert held in the lugs is accessible from the pocket.

16. The mold base of claim 13 wherein:
  a. the mold base has four lugs and four walls;
  b. each lug is connected by two ribs to two different walls such that there are eight ribs; and
  c. the ribs cooperate with the walls to define four pockets that intersect with the geometric shape periphery,
    so that an insert held in the lugs is accessible from four sides thereof.

17. The mold base of claim 16 wherein the ribs that connect each lug to two different walls cooperate with the two different walls to define a chamber at a mold base corner, and wherein the chamber is further defined by the floor.

18. The mold base of claim 17 wherein there is at least one hole through each wall that opens into each chamber.

19. In combination with first and second inserts with respective contoured surfaces that cooperate to define the outside of a selected part,
  first and second mold bases that removeably hold the first and second inserts, respectively, each mold base comprising a wall that defines an enclosed interior; a pair of lugs in the interior that removeably hold a selected one of the inserts and that are located on the periphery of a selected geometric shape; at least one rib connecting each lug with the wall; and a floor between each lug and the wall.

20. The combination of claim 19 wherein:
  a. each lug is connected to the wall by two ribs; and
  b. the ribs connecting two adjacent lugs cooperate with the wall to define a pocket bounded by the wall, the ribs connecting the two adjacent lugs to the wall, and a portion of the periphery of the geometric shape,
    so that an outside of the insert held in the mold base is accessible through the pocket.

21. The combination of claim 20 wherein each rib is notched to enable a coolant line to pass between two adjacent pockets.

22. The combination of claim 19 wherein each rib is notched to enable coolant lines to pass through the ribs.

23. The combination of claim 19 further comprising:
  a. an ejector housing fastened to the first mold base;
  b. an ejector plate guided on the ejector housing for sliding toward and away from the first mold base;
  c. a cap joined to the ejector plate; and
  d. a plurality of ejector pins captured between the ejector plate and the cap, the ejector pins passing through the selected geometric shape in the first mold base and entering the first insert.

* * * * *